(12) United States Patent
Kast

(10) Patent No.: US 9,535,992 B2
(45) Date of Patent: Jan. 3, 2017

(54) RECOMMENDATION ENGINE

(71) Applicant: LinkedIn Corporation, Mountain View, CA (US)

(72) Inventor: Anton P. Kast, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 312 days.

(21) Appl. No.: 14/334,587

(22) Filed: Jul. 17, 2014

(65) Prior Publication Data

US 2014/0330825 A1 Nov. 6, 2014

Related U.S. Application Data

(63) Continuation of application No. 13/924,794, filed on Jun. 24, 2013, now Pat. No. 8,869,042, which is a continuation of application No. 12/790,877, filed on May 31, 2010, now Pat. No. 8,555,173.

(60) Provisional application No. 61/182,758, filed on May 31, 2009.

(51) Int. Cl.
G06F 17/30 (2006.01)

(52) U.S. Cl.
CPC ... *G06F 17/30861* (2013.01); *G06F 17/30867* (2013.01); *G06F 17/30943* (2013.01)

(58) Field of Classification Search
CPC .................... G06F 17/30867; G06F 17/30861; G06F 17/30943
See application file for complete search history.

(56) References Cited

U.S. PATENT DOCUMENTS

| | | |
|---|---|---|
| 779,073 A | 1/1905 | Cowan |
| 5,729,700 A | 3/1998 | Melnikoff |
| 7,206,775 B2 | 4/2007 | Kaiser et al. |
| 7,624,095 B2 | 11/2009 | Majumder |
| 8,302,030 B2 | 10/2012 | Soroca et al. |
| 8,566,884 B2 | 10/2013 | Toebes et al. |
| 2006/0195790 A1 | 8/2006 | Beaupre et al. |
| 2007/0157797 A1 | 7/2007 | Hashizume et al. |

*Primary Examiner* — Sara England
(74) *Attorney, Agent, or Firm* — Park, Vaughan, Fleming & Dowler LLP

(57) ABSTRACT

Determining an item to present to a first user is disclosed. Preference information is received that comprises the preferences of a plurality of users associated with one or more items. User correlations are determined from the received preference information. For the first user, a set of other users most correlated with the first user is determined. One or more items are presented to the first user based at least in part on the preferences of the other users.

23 Claims, 15 Drawing Sheets

310 →

8 Comments: 3 by Friends sort by date (-4 diggs or higher) ⌄      Turn Profanity Filter On 404 — by Bob 21 hours ago    + 18 diggs   420
One thing the article didn't mention is just how expensive it is to build one of these. I'd estimate the cost at $100 if you buy the parts at garage sales.
[reply]

by Legolas 3 hours ago    - 1 digg
     424
410 — Bob rul3z! Come play poker on my website!

406 — by David 20 hours ago    Bob + 14 diggs
Something else to consider is that the project will take a lot of space and make a lot of noise/dust. If you don't have a workshop, you probably want to make sure your neighbors are out of town. :)
[reply]

by Leonardo 19 hours ago    + 4 diggs
This was on the front page over a week ago. Dupe! http://digg.com/design/Build_Your_Own_Microwave
[reply]

by TomTom 18 hours ago    + 2 diggs
I can't believe someone did this!
[reply]

408 — by CharlieB 10 hours ago    Bob + 11 diggs
Ok, I tried it out. Here are some pictures I took: http://www.charlieb.com/pix/microwave. As you can see, it didn't work very well.
[reply]

416 —      by shawnharvey 19 hours ago   [below viewing threshold, show comment] -75 diggs
     422

410 — by tomlee 7 hours ago    - 2 diggs
Dood!
[reply] 426

Add Your Comment by Alice (HTML tags aren't allowed. Comments are editable for 3 min.)

428

[Check Spelling] [Submit Comment]

Café Le French ⟋ 802
| 15 diggs |
|---|
| digg it |
 submitted by David 7 hours 26 minutes ago (via http://www.cafelefrench.com/menu)
Delicious tasting menu changes weekly. Menu focuses on seasonal ingredients. Can be very crowded at lunch. More...
Cuisine: French Bistro
TAGS: souflée— 808  ⟍ 804
Location: California >> San Francisco >> South of Market
 21 Comments  Problem? ▾
                                            \
FIG. 8A                                  806
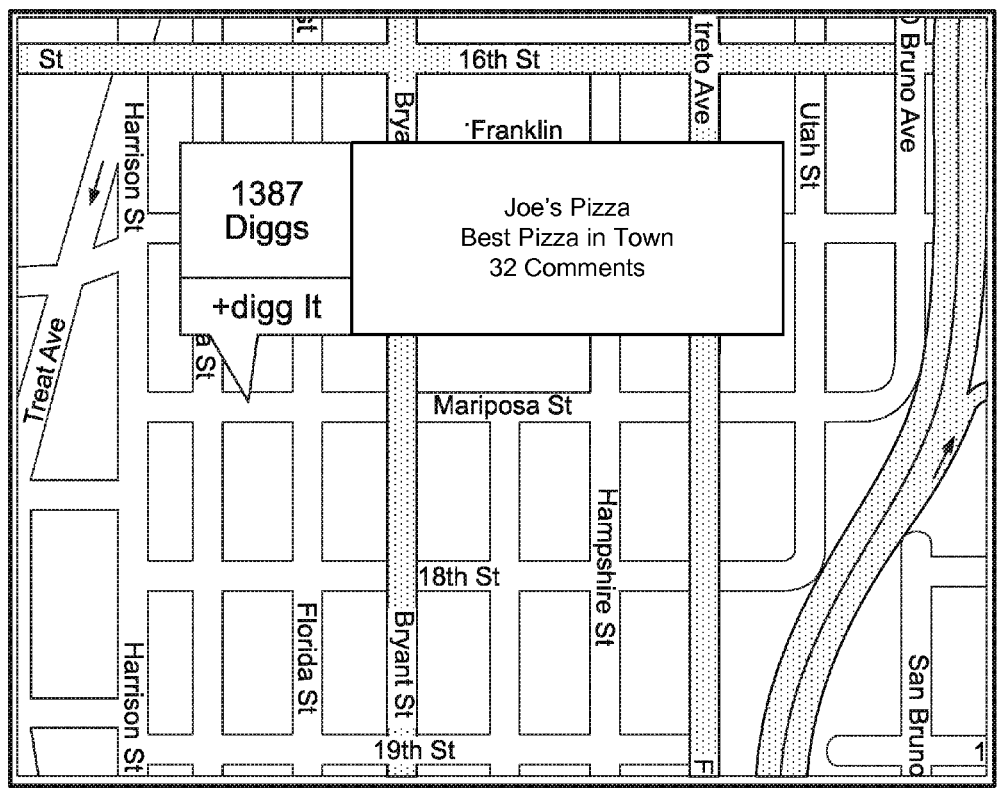
FIG. 8B

FIG. 10

<< Back to All Recommendations

Zippy                    1508— Remove from Recommendations         Add Friend —1510

In the last 30 days Zippy had        In the last 30 days you had        The two of you had in common 121 Diggs —1502              8 Diggs —1504              1 Digg —1506

26% Compatibility Score

1 Recommendation via Zippy: —1512
Recommendation via 3 people
An Algorithm to Solve All Sudoku Puzzles
[8] [dugg!]  submitted by Eve 8 hours ago (http://www.sudokunews.com/...)
A scientist working on developing images for microscopy accidentally found a universal solution to the Japanese brainteaser. More...
21 Comments   Topic: Math

FIG. 15

RECOMMENDATION ENGINE

CROSS REFERENCE TO OTHER APPLICATIONS

This application is a continuation of co-pending U.S. patent application Ser. No. 13/924,794, filed Jun. 24, 2013 and entitled RECOMMENDATION ENGINE, which is a continuation of U.S. patent application Ser. No. 12/790,877, filed May 31, 2010, which issued Oct. 8, 2013 as U.S. Pat. No. 8,555,173 and which claims priority to U.S. Provisional Patent Application No. 61/182,758, entitled RECOMMENDATION ENGINE and filed May 31, 2009. The preceding patent applications and provisional patent application are incorporated herein by reference for all purposes.

BACKGROUND OF THE INVENTION

Individuals browsing through a given corpus of information (such as a collection of documents) may have a difficult time efficiently locating content that is potentially of interest to them. Such difficulty typically increases with the size of the corpus. Accordingly, it would be desirable to assist the individual in locating content of interest.

BRIEF DESCRIPTION OF THE DRAWINGS

Various embodiments of the invention are disclosed in the following detailed description and the accompanying drawings.

FIG. 4 illustrates an embodiment of an interface to a preference system.

FIG. 5 illustrates an embodiment of an interface to a preference system.

FIG. 8A is an example of an item.

FIG. 8B illustrates an embodiment of an interface to a preference system.

FIG. 10 illustrates an embodiment of an interface to a preference system.

FIG. 15 illustrates an embodiment of an interface to a preference system.

DETAILED DESCRIPTION

The invention can be implemented in numerous ways, including as a process, an apparatus, a system, a composition of matter, a computer program product embodied on a computer readable storage medium, and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
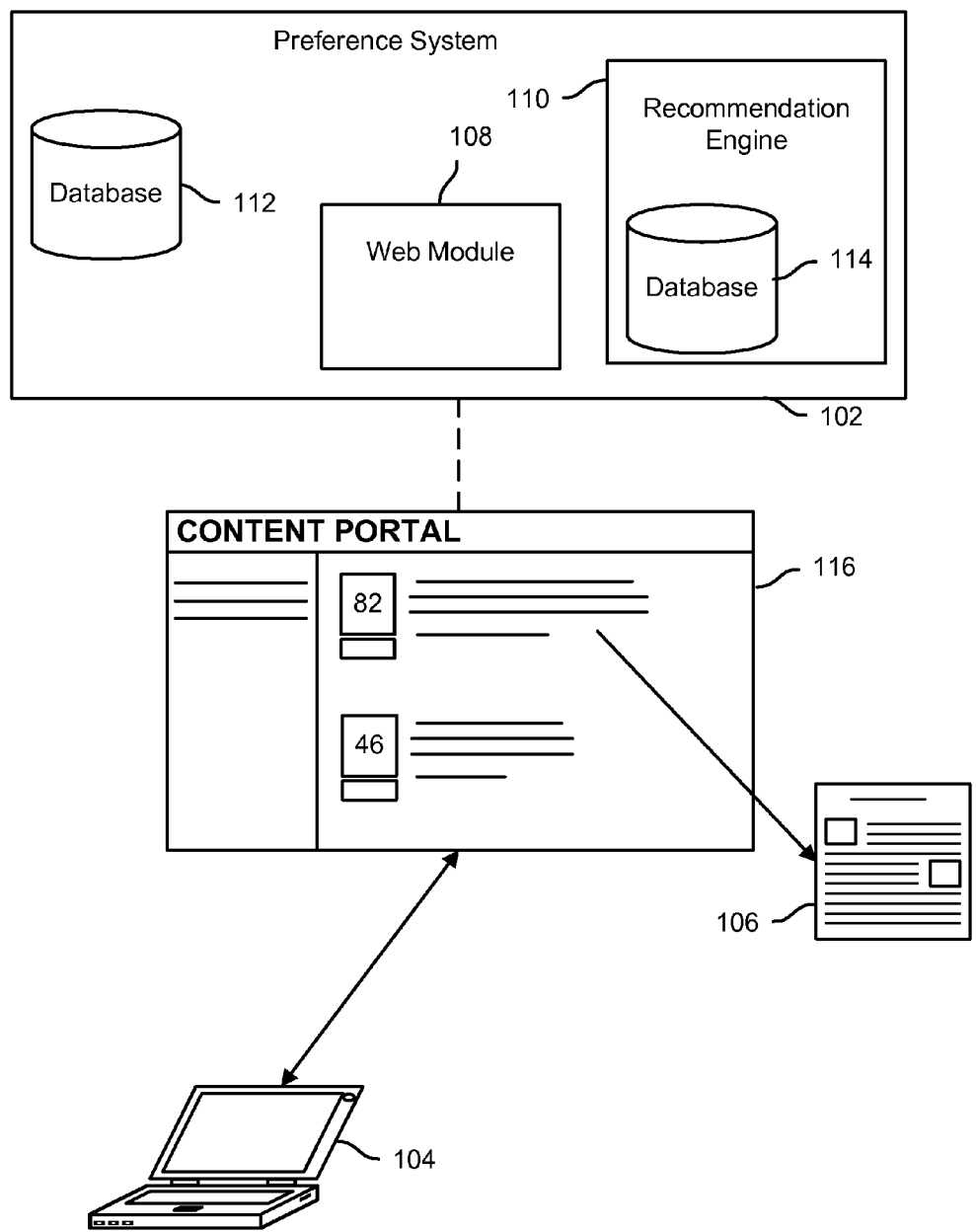
FIG. 1 illustrates an embodiment of an environment in which item recommendations are made.

FIG. 1 illustrates an embodiment of an environment in which item recommendations are made. In the example shown, users (e.g., a user of client 104) indicate preferences for items via preference system 102. Examples of items include news articles, blog posts, products, services, various other web pages, podcasts, photographs, and videos published by various publishers. Examples of clients include personal computers, laptops, cellular phones/personal digital assistants, and other types of information appliances such as set-top boxes, game consoles, broadband routers, file servers, video servers, and digital video recorders, as applicable.

As will be described in more detail below, preference system 102 is configured to provide a link to content (e.g., a hyperlink to site 106) and summary information pertaining to that content, and also to allow users to indicate their preferences for the content (and other items) by making a variety of interactions. For example, users can provide quantitative feedback such as a "thumbs up" (also referred to herein as a "digg") to indicate their preference for an item and can also "bury" an item to indicate their preference against that item for various reasons. Users can also discuss items with one another. These actions are referred to herein collectively as "preference events." In various embodiments, publishers register items with system 102. Users can also register items with system 102 by providing a uniform resource locator (URL) of the item. In such scenario, the user's registration (also referred to herein as a "submission") of the item is another example of a preference event.

When an item is submitted to system 102, an entry for the item is created in database 112. Information such as the submission time and the user who submitted the item are stored and counts associated with the item are initialized. Additionally, information associated with the submitting user is modified as appropriate. For example, a count of the number of items submitted by the user is incremented and the item is made available in areas such as the user's profile and the profile areas of the user's friends (described in more detail below), if applicable.

Preference system 102 includes a web module 108 that provides typical web server functionality such as serving website 116 and capturing user input. In the example shown, web module 108 is an Apache HTTP server that supports running PHP scripts. In various embodiments, the functionality of website 116 is exposed to users via one or more APIs, as applicable. Web module 108 is interfaced with a database 112, such as through a MySQL database backend. Whenever a preference event occurs (e.g., whenever a user submits, diggs, buries, or comments on an item), the event is recorded in database 112 along with associated information such as the identity of the user and a time/date stamp.

Also shown in FIG. 1 is recommendation engine 110, which is configured to provide item recommendations to users via website 116. Recommendation engine 110 can also provide item recommendations via other communication methods, such as via one or more APIs. As will be described in more detail below, recommendation engine 110 makes use of a database 114.

In some embodiments, the infrastructure provided by portions of preference system 102 is located on and/or replicated across a plurality of servers rather than the entirety of preference system 102 being collocated on a single platform. Such may be the case, for example, if the contents of database 112 are vast and/or there are many simultaneous visitors to site 116. Whenever system 102 performs a task, a single component, a subset of components, or all components of system 102 may cooperate to perform the task. Similarly, in some embodiments, portions of system 102 are provided by one or more third parties.

In the example shown, recommendation engine 110 is incorporated into system 102. Recommendation engine 110 can also be physically separate from system 102, but operated by the operator of system 102. In various embodiments, recommendation engine 110 is controlled by a party that is separate from the operator of preference system 102. In that scenario, recommendation engine 110 is configured to obtain any necessary information from system 102 (e.g., pertaining to preference events) via an API or via scraping techniques, as applicable. Recommendation engine 110 can also be configured to provide item recommendations using data sources other than system 102, such as a search engine or standalone restaurant review site.

Figure 2:
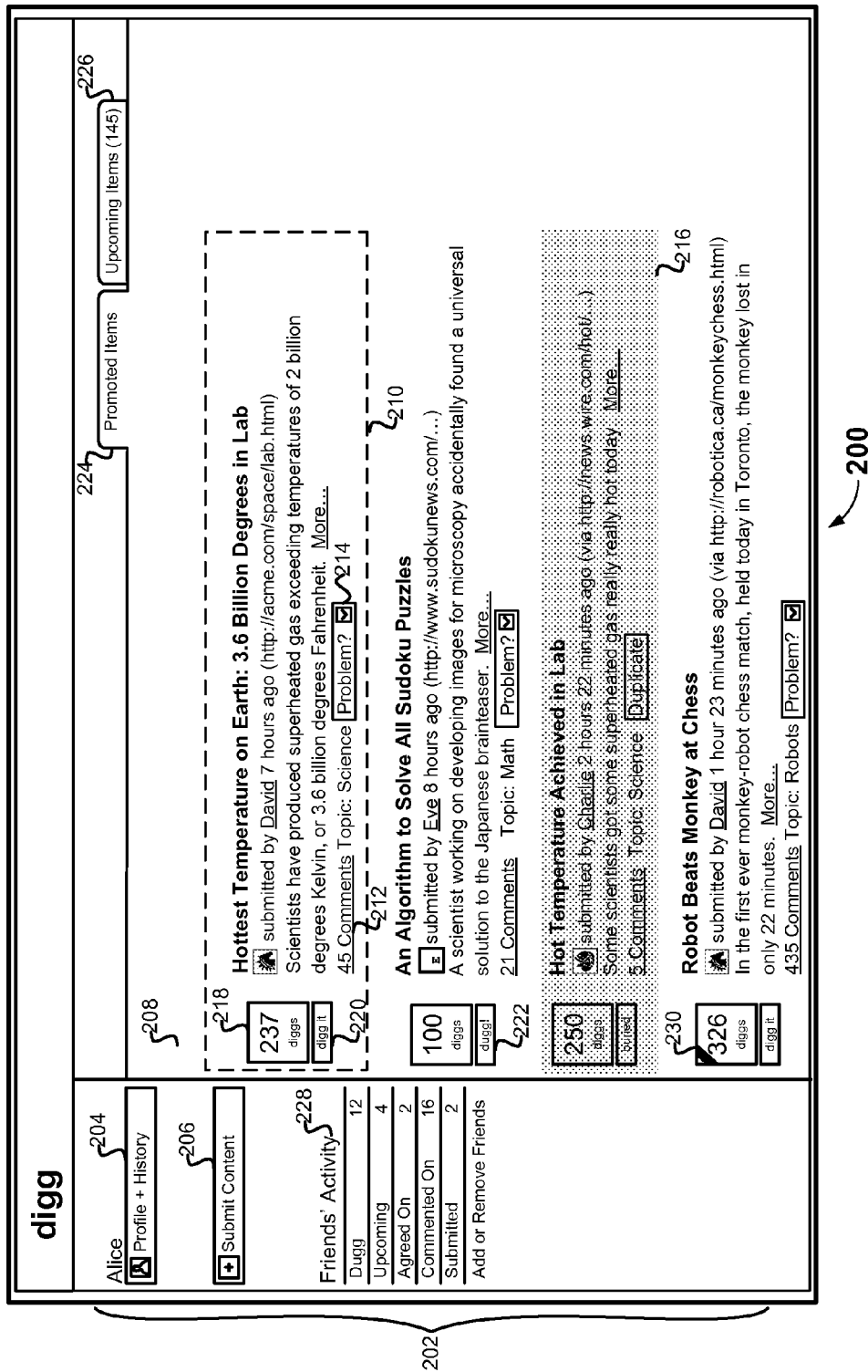
FIG. 2 illustrates an embodiment of an interface to a preference system.

FIG. 2 illustrates an embodiment of an interface to a preference system. The example shown is an implementation of a portion of website 116, as rendered in a browser. A user, known as "Alice" is logged into site 116. Interface 200 includes a sidebar 202 that provides access to various system services. For example, by selecting region 204 of sidebar 202, Alice is presented with an interface that permits her to view her profile and manage account settings, such as her current email address and password; view previous preference events she's taken (her "history"); and access friend-related features described in more detail below. By selecting region 206, Alice will be presented with an interface through which she can submit content for inclusion on system 102.

Region 208 displays representations of multiple content entries such as entry 210. In the example shown, each entry includes a title and other associated information, such as who submitted the content and when, the external URL of the content, the category to which the content belongs, and a summary of the content. Links are provided to the content directly (such as by clicking on the title), as well as to an area of site 116 associated with each specific item, referred to herein as the item's "permalink." For example, by clicking on the comments link (212) of the story, Alice will be presented with the comments portion of the permalink described in more detail below.

Content entry 210 also includes a problem reporting region 214. Users may report problems for a variety of reasons. For example, the first content entry and the third content entry are both news articles describing the same news—scientists superheating a gas. Accordingly, Alice selects the problem, "duplicate" content, which has the effect in this embodiment of graying out the content, represented here by stippling (216).

Each content entry has one or more scores associated with it. In the example shown, the "digg" score (218) for each item is displayed, as is an interactive region beneath the score (box 220) that allows a user to "digg" the item. The first item has been dugg 237 times, but has not been dugg by Alice. As described in more detail below, if Alice were to select region 218, a variety of actions would be immediately taken, including increasing the digg score of the story and updating the region's text from "digg it" to "dugg!" as shown in region 222.

Alice is currently viewing a "promoted items" (224) view of region 208. This means that all of the items presented to Alice on the current view of the interface have exceeded a promotion threshold. One example of a promotion threshold is the raw number of diggs. Other requirements/factors may be used for thresholding in addition to or instead of a digg score, such as requiring that a certain amount of time elapse between content submission and promotion, the speed with which content is being dugg by others, the identity of those digging the content, and other information associated with users that have dugg the content. Because some threshold of users must agree that an item has merit before being promoted, items shown in promoted view 224 are unlikely to contain spam or otherwise be inherently inappropriate for Alice's viewing. In some embodiments, different thresholds are used for different content. For example, the promotion of a math related news article may only require 100 diggs whereas an article about the president may require 500 diggs.

If Alice selects the upcoming content tab (226), only content which has not yet met the appropriate threshold will be displayed. For example, newly submitted content which has not yet been "dugg" by a sufficient number of people will be presented by selecting tab 226. In some embodiments, if content languishes in the upcoming pool for more than a certain period of time without receiving a sufficient digg score to be promoted (e.g., for a week), the content is removed from the pool and can only be found via its permalink or through a search. In some embodiments, such content is deleted from database 112 because it is indicative of problematic content such as spam, extremely biased or unfounded news articles, etc. Similarly, if enough users bury content, the content may be removed from the pool and/or database 112. In other embodiments, other views of content may be presented as applicable, such as a view that unifies both the promoted and the upcoming groups.

Portion 228 of interface 200 displays the recent activities (preference events) of Alice's friends. For example, in the last 48 hours, Alice's friends have submitted two items, dugg twelve items, and commented on sixteen items, as reflected in dashboard 228. Of the twelve items her friends have dugg, four of the items have not yet been promoted. In some embodiments, assorted visual cues of her friends' activity are presented throughout website 116. In the example shown, items dugg by Alice's friends are notated by a banner (230) placed across the digg score. In other cases, other cues may be used.

Figure 3:
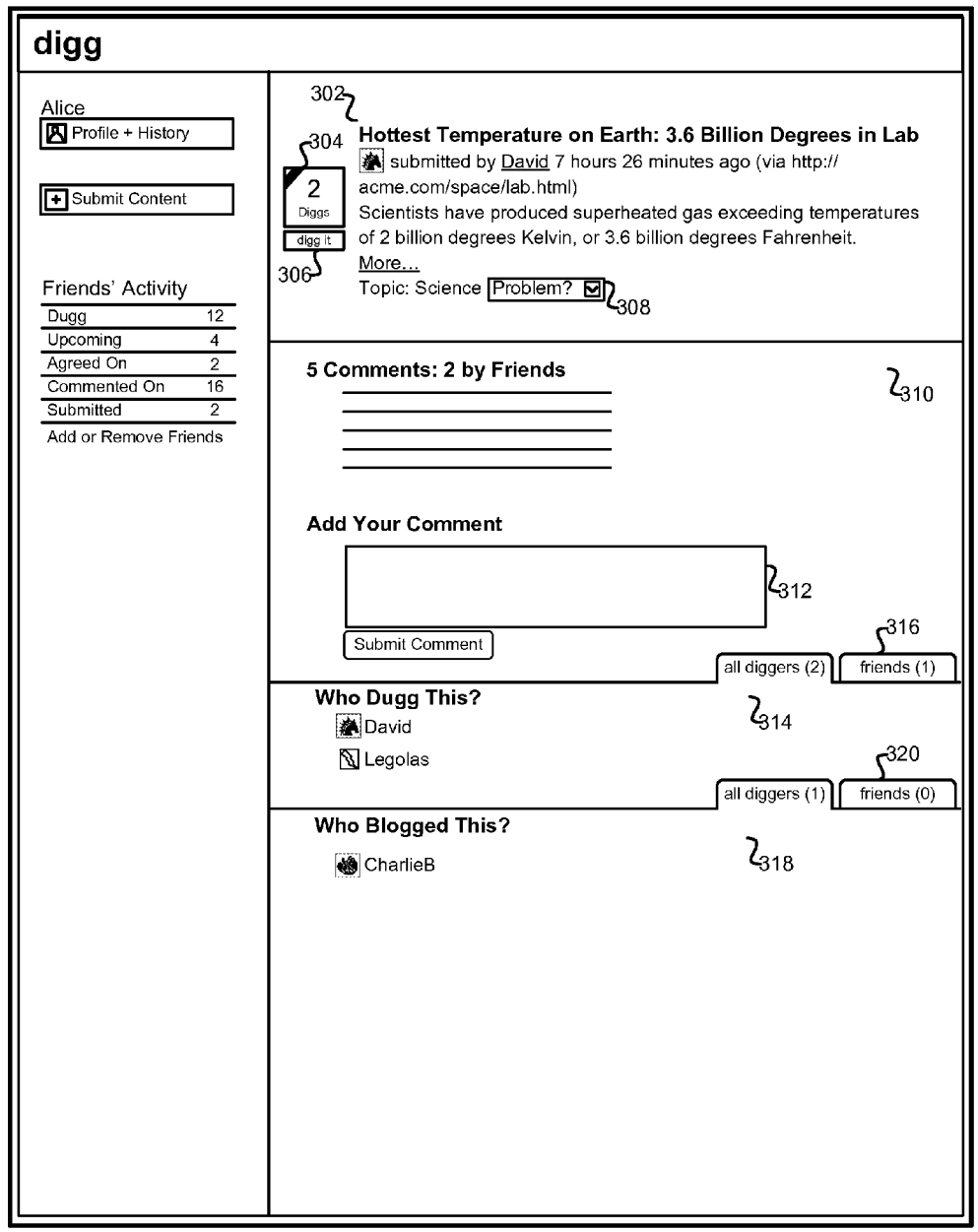
FIG. 3 illustrates an embodiment of a content permalink.

FIG. 3 illustrates an embodiment of a content permalink. The example shown is an implementation of a portion of website 116 as rendered in a browser. Each item submitted to system 102 has a corresponding permalink page that includes content assembled dynamically from the information stored in database 112.

In the example shown, content 302 (a news article) was recently submitted to server 102 (26 minutes ago) by a user, David, who also dugg the story. Alice has David listed under her profile as her friend. As a result, the digg count includes a visual indication 304 that article 302 was dugg by a friend. In some cases, Alice and David know each other and have each other, mutually, on their list of friends. In other cases, the relation may be one sided. For example, David may be a columnist or famous personality whose opinion Alice values.

The digg score of article 302 is currently two (304) and the article has not met the threshold(s) required for the story to be promoted out of the "upcoming" area.

In the interface shown in FIG. 3, Alice can click digg box 306 to indicate her preference for the article. In some embodiments, additional actions are taken when Alice diggs a story. For example, if she has configured her blog settings, Alice can specify that stories that she diggs be posted to her blog as she diggs them. Similarly, Alice can configure her personal website (e.g., with a JavaScript) to automatically syndicate recent activities taken in response to stories.

She can report a problem with the article (bury it) by selecting an option from problem dropdown 308. Reporting options include "duplicate" article (to report that article 302 is a duplicate of another article), "bad link" (to report that the link to the full text of the article is defective), "spam" (to indicate that the article is fraudulent or spam), "inaccurate" (to indicate that there are factual problems with the article), and "old news" and "this is lame" to indicate that the article is not newsworthy. In some embodiments, bury events are anonymous site wide and are not replicated, for example, in a user's publicly accessibly digging history. One reason for this is to minimize the chances of a "flame war" occurring, for example, when a well-known user negatively rates content or a comment. In other embodiments, bury events are made by users purely to indicate their dislike of an item.

In various embodiments, different problem reporting options are made available based on the type of content. For example, for video content, a bury option of "poor quality" can be included to allow users to report blocky, choppy, or otherwise defective video. For products, a bury option of "mine broke" would allow a user to indicate that the product was flimsy.

Region 310 displays comments that users have made about article 302. Thus far, a total of five comments have been left about article 302, two of which were left by Alice's friends. Alice can submit comments by entering information into region 312 of FIG. 3.

In region 314, Alice is currently viewing a list of all the users who dugg article 302. Suppose David is Alice's friend, but Legolas is not. If Alice selects friends tab 316, the view in region 314 will change to show only David's name and avatar icon.

In region 318, Alice is currently viewing a list of the users who have blogged article 302. Charlie is the only person who has blogged the article so far and he is not Alice's friend. Therefore, if Alice were to select friends tab 320, no names would be shown.

FIG. 4 illustrates an embodiment of an interface to a preference system. The example shown is an implementation of portion 310 of website 116, as rendered in a browser. In the example shown, Alice is viewing comments associated with an article. The article currently has eight comments (402), sorted by date. A threshold of −4 diggs or higher has also been applied (418). Thus, comment 416, which has been buried 75 times, is hidden. In the example shown, only the header of a buried comment is displayed, along with a link to reveal the hidden comment (422). Additionally, the header of comment 416 is greyed out to help a user visually distinguish between buried and non-buried comments.

Comment 404 was written by Bob, one of Alice's friends, as was comment 406 (written by David). In this example, comments written by friends are distinguished from other comments, such as through having a differently colored header. Comments dugg by friends are also distinguished. In the example shown, Bob has written an informative comment, which 18 people have dugg. If desired, Alice can digg or bury Bob's comment by selecting the appropriate icon at 420. In the example shown, the digg icon is a green thumb pointing up. The bury icon is a red thumb pointing down. If Alice selects one of the icons, Bob's comment score is immediately updated and the thumbs are greyed out to indicate to Alice that she's already registered her preference for Bob's comment.

Suppose Alice finds comment 410 to be off topic or otherwise unhelpful. If she chooses to bury the comment, in the example shown, the comment score for comment 410 will decrement by one point. In some embodiments, if enough people bury a comment, the comment is removed from the site and/or reported to an administrator. If desired, Alice can submit one or more comments of her own. For example, she may reply to an existing comment by selecting the reply button associated with the comment (426) or create a new comment by submitting text through region 428. When Alice submits or diggs a comment, that preference event is recorded in database 112 and her profile and the profiles of her friends are immediately updated.

Figure 5:
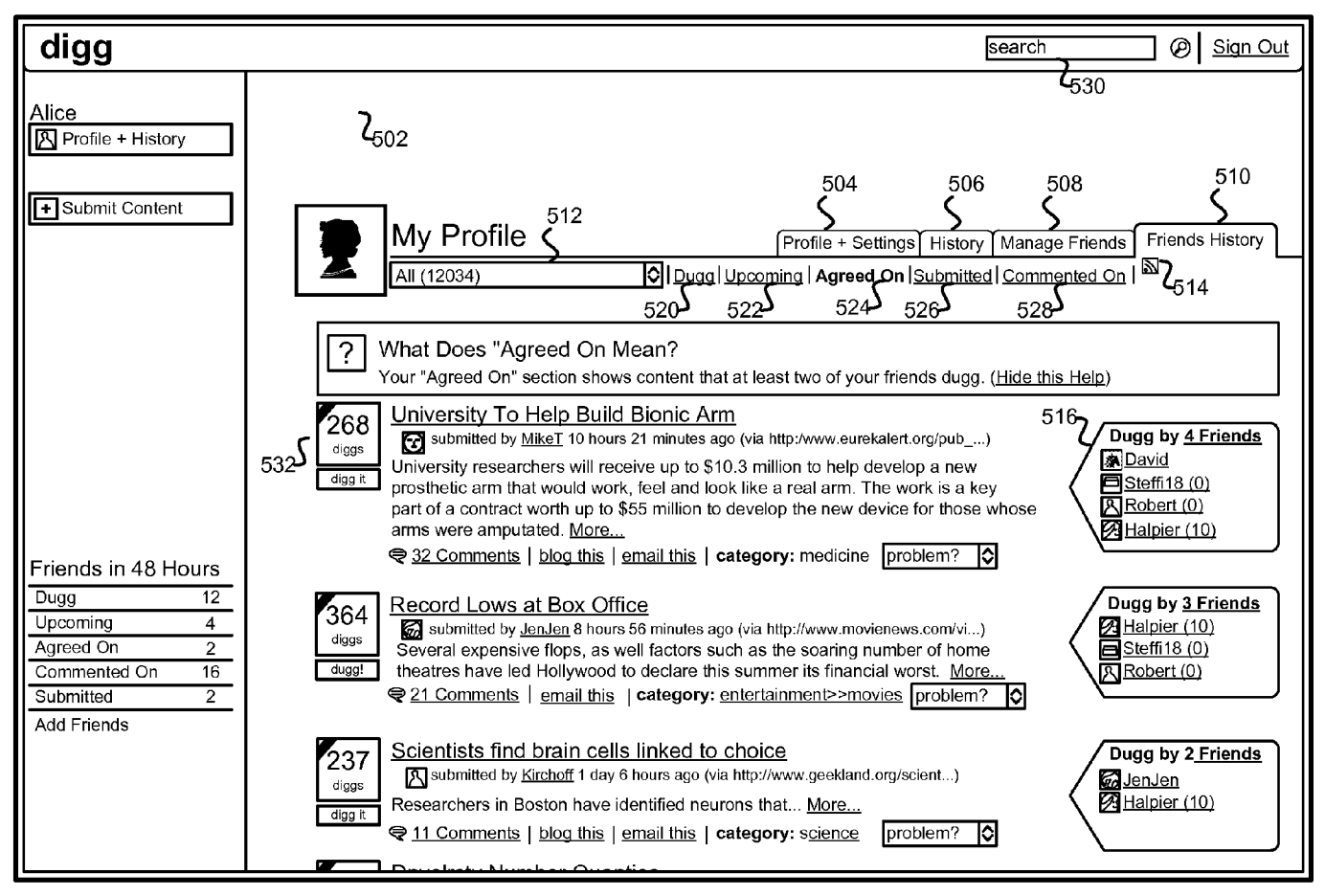

FIG. 5 illustrates an embodiment of an interface to a preference system. The example shown is an implementation of a portion of website 116 reached by selecting region 204, as rendered in a browser. In this example, Alice is viewing her profile (hereinafter "interface 502"), which has been subdivided into several tabbed views (504-510). A profile provides access to a variety of information, some of which may be publicly viewable and some of which may be kept private. Visitors to Alice's profile will be presented with a subset of the information available to Alice. For example, while Alice sees tab 504 being labeled "Profile+Settings," a visitor to Alice's profile would see tab 504 as leading to Alice's "Profile" only. Similarly, tab 508, which by selecting allows Alice to add and remove friends, is only available to Alice and is hidden from visitors to her profile. Alice can also add friends by visiting other users' profiles and selecting an "add this user as my friend" option located in the profile.

Alice has currently elected to view her friends' history by selecting portion 510 of interface 502. The information presented can be further customized by selecting from subsets of information. For example, if Alice selects portion 520 of interface 502, she will be presented with a listing of all of the stories that have been dugg by at least one of her friends. If she selects portion 522, she will be presented with a list of stories that have been dugg by at least one of her friends but have not yet been promoted. If she selects portion 526, Alice will be presented with a list of stories submitted by her friends and by selecting portion 528, Alice will be presented with a list of stories that have been commented on by her friends. Other information (not shown) may also be presented in other embodiments, such as a list of comments that Alice and/or her friends have dugg.

In the example shown, Alice has elected to view stories "agreed on" by her friends (524). Each of the stories listed in this view have been dugg by at least three of Alice's friends. In various embodiments, Alice can configure the threshold and specify such information as the number of friends (or total number of diggs) required for a story to be agreed upon and/or define particular individuals whose digg is necessary for a story to be considered agreed upon, keywords that must be present in the story, etc. By making use of the "agreed on" view, Alice can readily discern the most important stories, even if she has thousands of friends. (I.e., if she sets the threshold to "agreed on by at least 10 friends" and has 1000 friends, the number of stories she is presented with is likely to be manageable and especially relevant or interesting.) Region 516 of interface 502 indicates that four of Alice's friends have dugg story 532. Alice can also see which of her friends have dugg story 532 by hovering her input device over the digg score box of story 532.

By selecting portion 506 of interface 502, both Alice and visitors to Alice's profile will be presented with Alice's history in a format similar to that currently shown, but limited to activities taken by Alice. Additionally, Alice may "undigg" stories and comments that she previously dugg by visiting her history.

Suppose Bob has listed Alice as his friend. Whenever Alice submits a new story, that new story immediately appears on Bob's "Friends-Submitted" list. Similarly, whenever David comments on an article, that fact is immediately reflected under Alice's tab 528 as shown in FIG. 5. As described herein, pages served by web module 108 include Asynchronous JavaScript and XML (Ajax) components. Other techniques may also be used to dynamically update site 116 as rendered in a browser (or other application) as appropriate.

Figure 6:
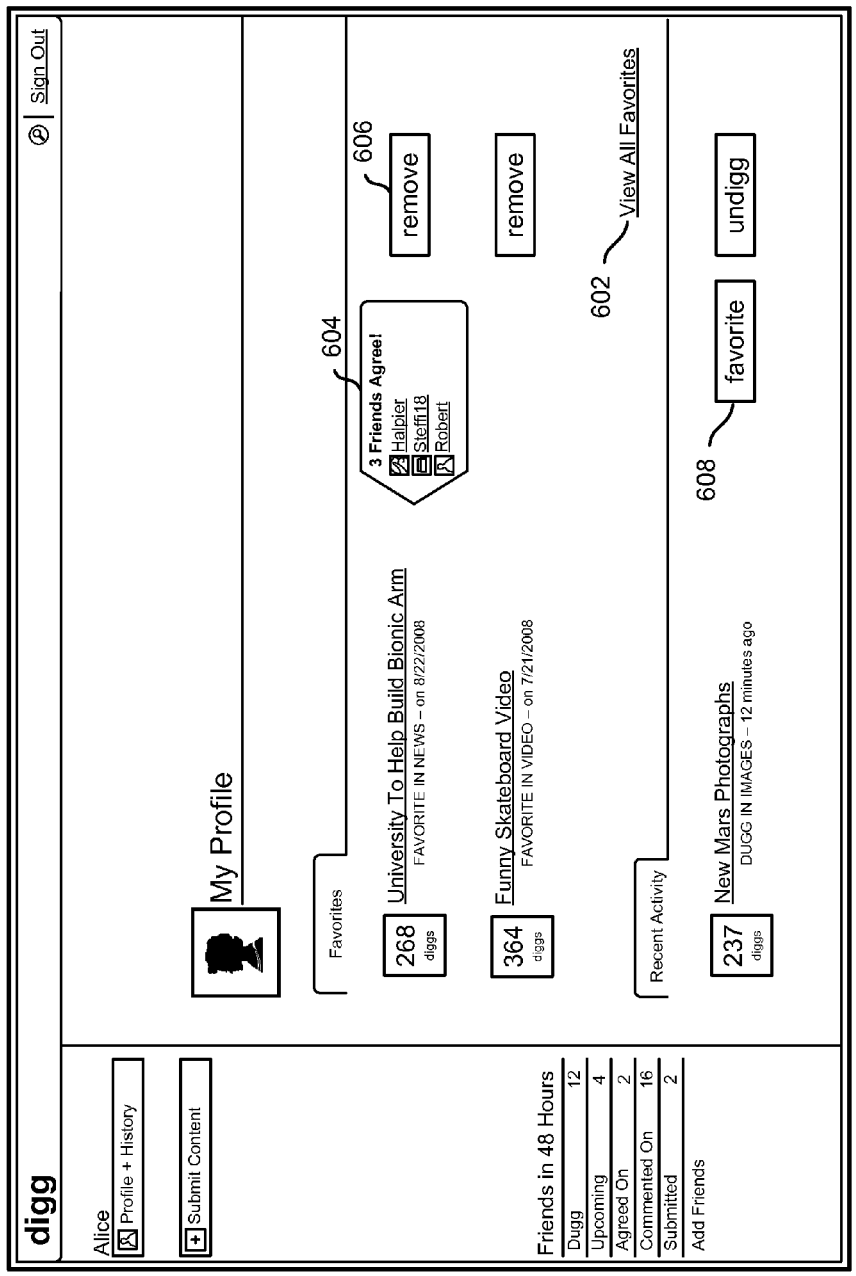
FIG. 6 illustrates an embodiment of an interface to a preference system.

FIG. 6 illustrates an embodiment of an interface to a preference system. In the example shown, Alice is viewing a list of items that she has designated as being her favorite, e.g. by selecting region 608. In some embodiments, Alice can have a single favorite item at any given time listed in her profile, also referred to herein as "My #1," indicating that the item is Alice's #1 favorite item. In other embodiments, Alice can have a single favorite item per category (e.g., favorite sports story, favorite politics story etc.) or per type of item (e.g., favorite restaurant, favorite video, favorite news item, favorite podcast, etc.). In any of the above cases, if she subsequently marks another item as "favorite" that newly selected item will replace the corresponding existing favorite item in Alice's profile. Items previously designated as "#1" are noted in an archive of "#1" items that can be accessed, e.g., by following a link 602.

In some embodiments, Alice can designate multiple favorites, in all categories/types of content, and a rolling list of the most recent designations is displayed in her profile, with older favorites accessible via link 602.

In various embodiments, the history of Alice's favorites is color coded. For example, more recent favorites are green and older ones are red. Other visual indicators may also be used. For example, the more users that have the same content designated as favorite, the brighter the designation appears. If the same content is designated as favorite by many users right now, that content is "hot" and appears with flames around it in the "favorite" section of Alice's profile. If only a few people have that content marked as a favorite, the content may be "icy cold" as indicated by a blue color scheme.

Alice can remove her "favorite" designation of content by selecting region 606. For example, suppose Alice designated a particular MP3 player (one that she owns) as a favorite. The MP3 player was actually of poor quality and subsequently broke. Alice does not want other users to think that she still approves of it, so she removes the favorite designation. If instead of breaking, Alice merely received a newer, better player, she may wish to retain the favorite designation for the old player and also mark her new player as favorite, so that other users know that she likes both players. In some embodiments, if Alice undiggs a particular content, any favorite designations that she may have made with respect to that content are automatically removed.

Alice can also view the favorite content of her friends (and other users) by visiting their respective profiles and selecting a "favorites" tab. Alice can also perform a user search to find other users with similar favorites to discover new friends and/or to discover new content. For example, Alice could designate a particular restaurant as her favorite and then perform a search to determine "where people who also like my #1 restaurant buy books?" Alice could designate a movie as being her favorite and then determine "what news stories are people who also share my favorite movie reading now?"

Alice can also see which content she and her friends have commonly designated as favorite, e.g. through information displayed in region 604. In some embodiments, Alice can also see the aggregate favorites of her friends by selecting a "see my Friends' #1s" link within her own profile, which in turn shows one favorite per friend, such as the item most recently designated as favorite by that friend. The aggregate view is customizable, and also allows, e.g., Alice to sort the favorites by the number of friends who at one point in time (or currently) also have designated the content as a favorite.

Statistics on the favorite content of users site-wide is tracked and can be displayed according to different periods of time, different groups of users, different categories/types of content, etc. For example, Alice can view "the content most often designated as favorite of all time," search for "the most frequently #1 restaurant [bar, dry cleaner] in Chicago [or a zip code or an area code]," see "the product with the most favorite designations right now," search for "the MP3 player with the most #1 designations between December 1 and January 31 of last year," find "the #1 fiction book as designated on the lists of female users between the ages of 13 and 25," and so on. A "top ten" list of favorite content can also be displayed, e.g. showing the relative positions of content based on the number of favorite designations, such as "this story is currently #3 in the ranking, up from #6 last week."

Time-based information can also be used to indicate the "staying power" of the favorite designations for content. For example, if many people leave the same content at the top of their favorite list before replacing it with other content, this statistic can be measured, searched for, etc. Examples include a search for "the content with the longest average streak of being a user's favorite content," "the content that, once designated as a favorite, remains a favorite the least amount of time," and so on.

Favorite content can also be analyzed to determine particular topics or subjects of interest to a user which can subsequently be consumed by modules such as server 106.

For example, suppose Alice designates as favorite a photograph of the fictional town of Springfield, a video clip of The Simpsons television show, and an article about a chain of convenience stores redecorating with a Simpsons theme. Collectively, the content marked as favorite indicates that "The Simpsons" is a concept in which Alice has a strong interest.

Figure 7:
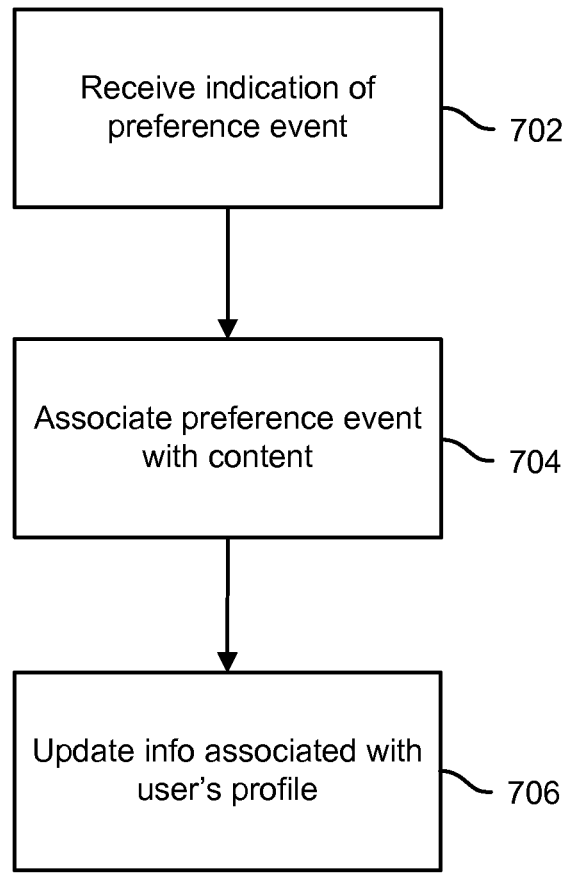
FIG. 7 is a flow chart illustrating an embodiment of a process for recording a preference for an item.

FIG. 7 is a flow chart illustrating an embodiment of a process for recording a preference for an item. The process begins at 702 when an indication that a preference event has occurred is received. For example, when Alice selects digg box 306 shown in FIG. 3, her preference is received at 702. Other examples of preference events include submitting an item, burying an item, and commenting on an item. At 704, the preference event is associated with the item and any associated scores are updated as applicable. For example, at 704, Alice and story 302 are linked in database 112 and the digg score of story 302 is increased in database 112 from two to three. At 706, information associated with the user's profile is updated. For example, views of Alice's digging history (including the friend views of users who have listed Alice as a friend) are updated to include the dugg story and an indication that Alice dugg it.

Additional Types of Items

As used herein, permalink pages for items made available via system 102 include links or other pointers to the original form of the content (e.g., news articles and podcasts), such as may be hosted by a third party publishing site. In some embodiments, users submit the content itself (e.g. the full text of articles and the audio file) rather than or in addition to a link to the content and the techniques described herein are adapted accordingly.

As explained above, items are not limited to news articles. Other items can also be submitted, dugg, buried, and/or commented on and the techniques described herein can be adapted as appropriate. For example, preference events taken on various types of items can be associated with a profile and shared with friends in a manner similar to that described in conjunction with FIG. 5.

FIG. 8A is an example of an item. The example shown represents a restaurant submission. The name of the restaurant (802) is included, as is information such as who submitted the restaurant, the URL of the restaurant, the type of cuisine it serves (804), and the general location of the restaurant (806). Users may perform such actions as searching for restaurants by cuisine type and/or location and limiting results to ones having a threshold number of diggs. Restaurants having no or few diggs can be displayed as "upcoming restaurants," separated from "promoted restaurants" which have digg scores exceeding a threshold. Users can also supply additional information about their preferences for the restaurant, such as by supplying one or more tags (808) that indicate attributes such as "ambiance" or signature dishes. Which fields/tags are collected at submission time (and which, if any, can be added subsequently) and shown can be configured as appropriate depending on the type of content. For example, in the case of a product, a stock photo of the product may be included.

FIG. 8B illustrates an embodiment of an interface to a preference system. In the example shown, digging functionality has been combined with mapping functionality. When a user searches a map, such as a web-based map service, for nearby restaurants, entries on the map include an indication of the number of diggs a business has had and the ability to digg or comment on the business directly from the map interface.

Figure 9:
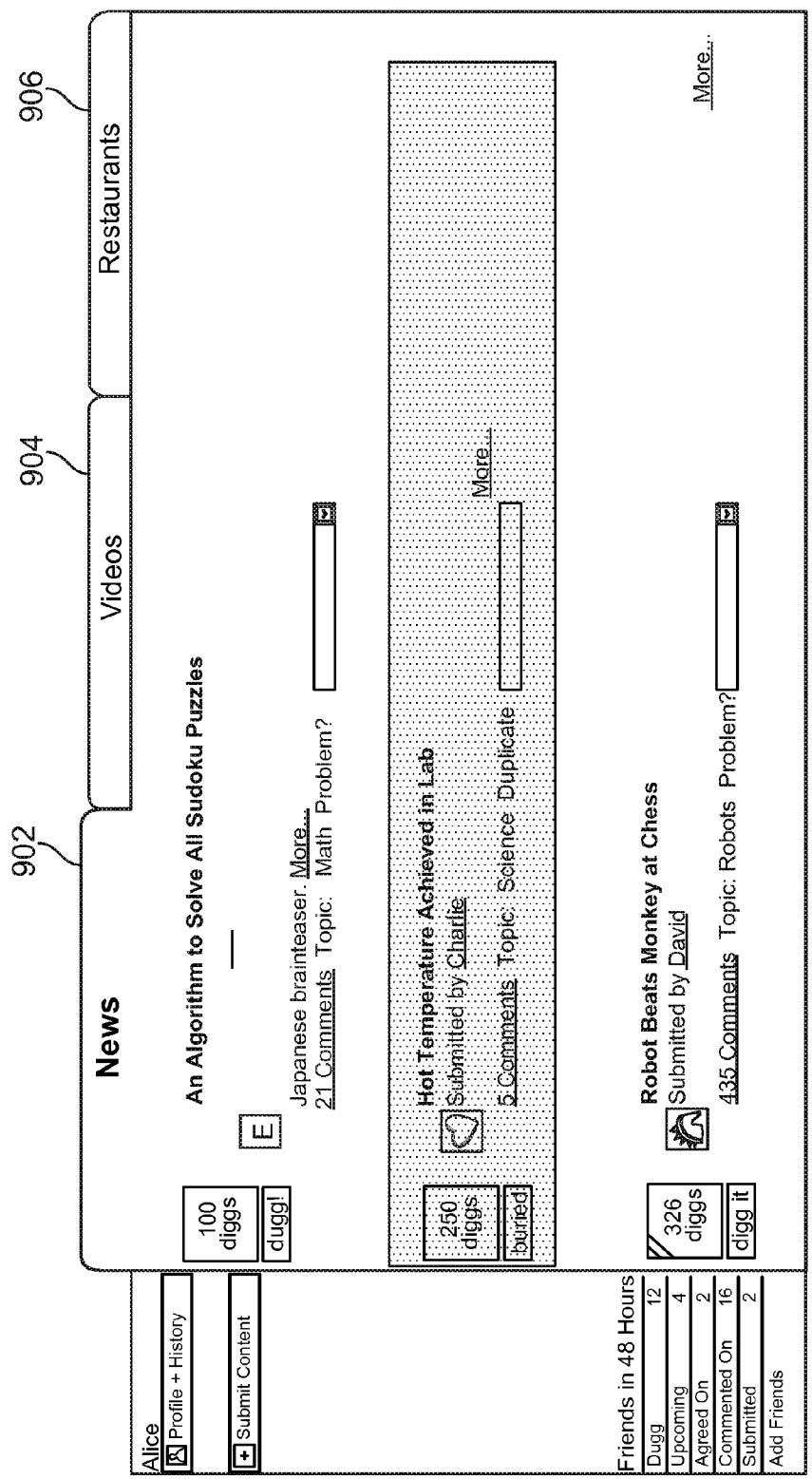
FIG. 9 illustrates an embodiment of an interface to a preference system.

FIG. 9 illustrates an embodiment of an interface to a preference system. In the example shown, the interface unifies a user's preference for items across multiple genres of content. For example, the user can digg for news (902), videos (904), and restaurants (906) all through the same interface. Additionally, using the interface shown in FIG. 9, a visitor to Alice's profile can learn which news stories she's been digging as well as learn which restaurants she diggs or doesn't digg. Similarly, Alice can customize the views of each of the tabs (902, 904, 906) to display only restaurants her friends of agreed on, restaurants nearby (e.g., by selecting a region on a map or entering a ZIP code) that at least one friend has dugg, etc.

Figure 10:
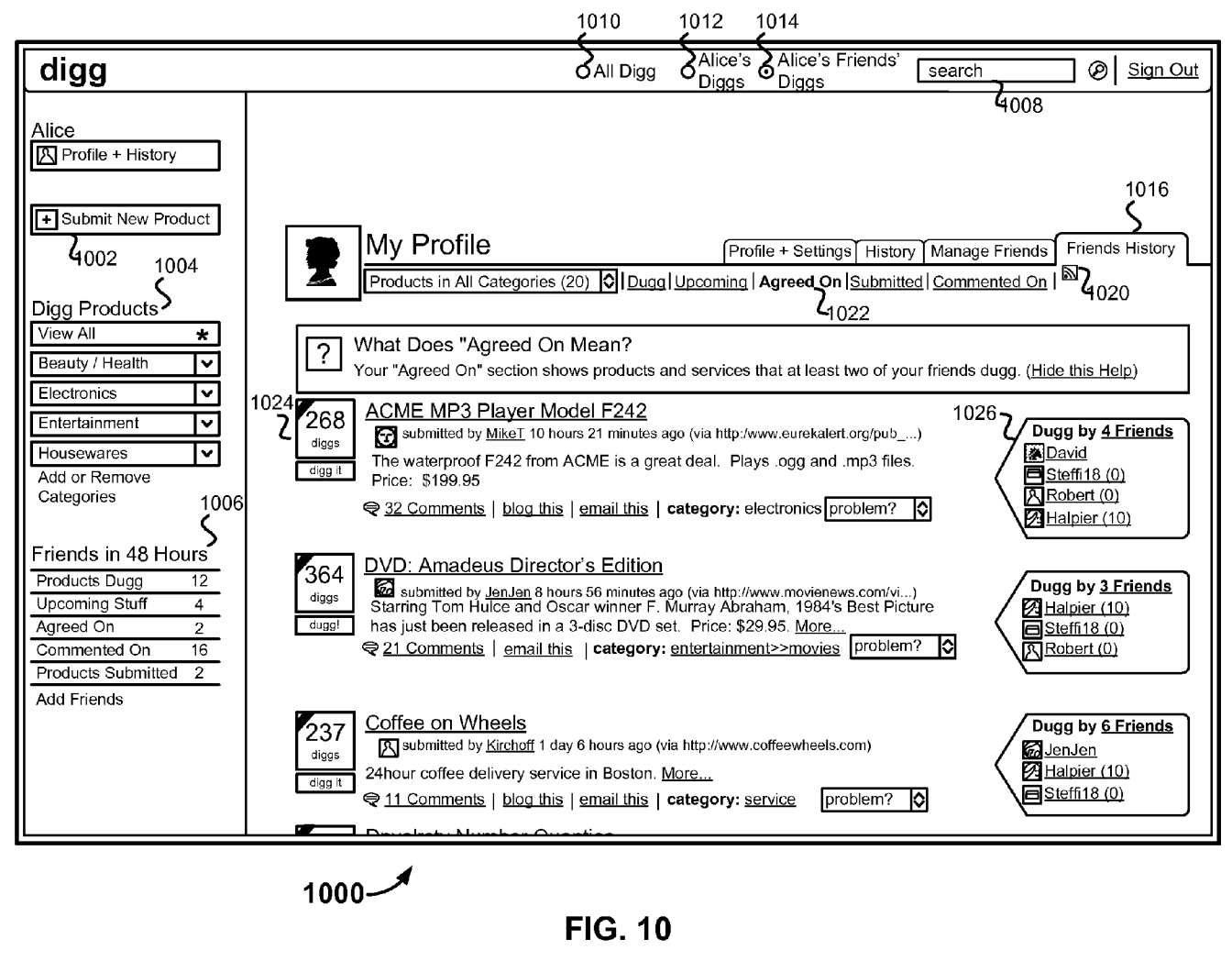

FIG. 10 illustrates an embodiment of an interface to a preference system. The example shown is an implementation of a portion of website 116 which includes the ability to submit, digg, and comment on products (including software), as rendered in a browser. In this example, Alice has selected to view products agreed on by her friends (1022).

Alice can submit a new product review by selecting portion 1002 of interface 1000. She can view products in one or more categories by selecting the appropriate portion of region 1004. Portion 1006 of interface 1000 displays the recent activities of Alice's friends in a dashboard format.

Region 1026 of interface 1000 indicates that four of Alice's friends have dugg product 1024, the ACME MP3 player. Alice can also see which of her friends have dugg product 1024 by hovering her input device over the digg score box of product 1024. In some embodiments, Alice can interact with region 1026, such as by being presented with a dialogue that offers to send an email to all of her friends listed in the region. In some embodiments, additional actions can be taken with product 1024. For example, Alice may be presented a "buy this product now" icon or link.

In some embodiments, profile visitors (including Alice) are presented with the option to search (1008) all of site 116 for product keywords (1010), search Alice's diggs for product keywords (1012), and/or search diggs made by Alice's friends for product keywords (1014). For example, a visitor to Alice's profile can search for MP3 players that she has dugg or commented on. In some embodiments, search interface 1008 includes the ability to filter results on meta information such as regions for DVDs, languages for books, etc. In some embodiments, views (and searches) can be limited by other factors, such as location (distance from Alice), availability (whether a product is in stock and how quickly it can arrive), etc.

Figure 11:
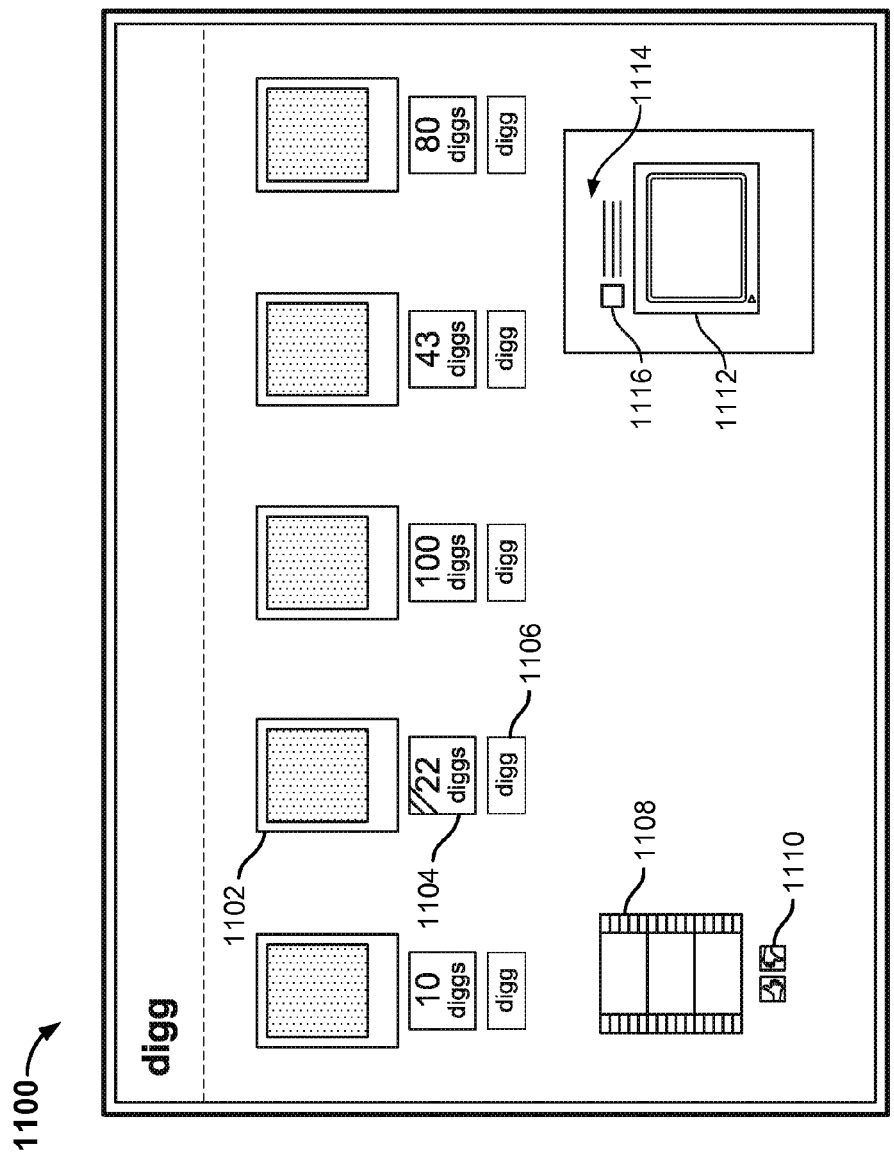
FIG. 11 illustrates an embodiment of an interface to a preference system.

FIG. 11 illustrates an embodiment of an interface to a preference system. The example shown is an implementation of a portion of website 116 which includes the ability to submit, digg, and comment on photographs and video, as rendered in a browser. In the example shown, photograph 1102 was dugg by a friend, as indicated by banner 1104. By selecting digg box 1106, a visitor can indicate a preference for the photograph shown. In some embodiments, visitors indicate their preference for content such as video 1108 by selecting an icon such as icon 1110.

The content shown in interface 1100 can be presented in a variety of ways. For example, video content may be represented as an icon, such as the filmstrip icon shown at 1108. A screen shot of the first frame of the video may also be shown, and interactions, such as hovering a mouse over region 1108 could trigger actions such as causing the video to be played in the browser. In some cases, it may not be possible to embed the content directly into the interface shown in FIG. 11. In such a case, the video is shown in a format similar to item 210 (1116) and a preview button 1114 is included. When preview button 1114 is selected, a video player 1112 automatically slides out in which the video can be displayed. Permalink pages, such as the one shown in FIG. 3, can be adapted for photograph and video content as appropriate and users may comment, blog, and take other actions with respect to visual and other content (such as songs) as appropriate.

Recommendation Engine

Users will typically be unable to review all of the content made available via content portal 116. For example, if there are sixteen thousand items currently available under the "upcoming" tab, a user such as Alice will be very unlikely to review each of those items to see if it is of interest to her. Unfortunately, it is possible that there are some items in "upcoming" that would be of interest to Alice, but due to the sheer volume of items present, Alice is unlikely to want to or be able to sift through them to locate all of the items of interest to her. In various embodiments, recommendation engine 110 is configured to assist Alice in locating items of (potential) interest.

Figure 12:
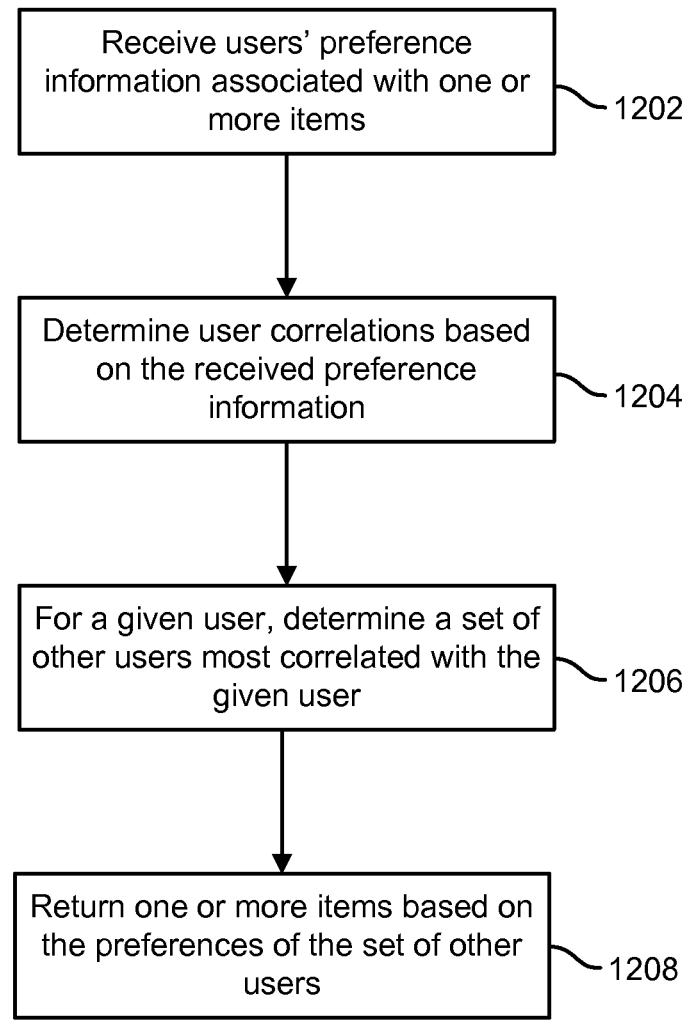
FIG. 12 is a flow chart illustrating an embodiment of a process for generating an item recommendation.

FIG. 12 is a flow chart illustrating an embodiment of a process for generating an item recommendation. In some embodiments, the process shown in FIG. 12 is performed by recommendation engine 110. The process begins at 1202 when the preferences of users for (or against) items are received. As one example of the processing performed at 1202, whenever a preference event is received by system 102, the event is stored in database 114, as well as in database 112. In other embodiments, other preference information can also be received at 1202. For example, instead of receiving a digg (a positive preference) or a bury (a negative preference), a star value (e.g., rating an item on a scale from 1 to 5) or score (e.g., rating an item 8.4) could also be received at 1202 from various users and the techniques described herein adapted accordingly.

In some embodiments, database 114 is configured to store preference information in the following manner. Each time a user diggs an item, recommendation engine 110 determines which users dugg the same item prior (also referred to herein as "pre-diggers"). A directed link (using the dugg item) is then made in database 114 from the digger to each of the pre-diggers, with respect to that item. An illustration of a graph that can be constructed from the data received at 1202 is shown in FIG. 13.

Figure 13:
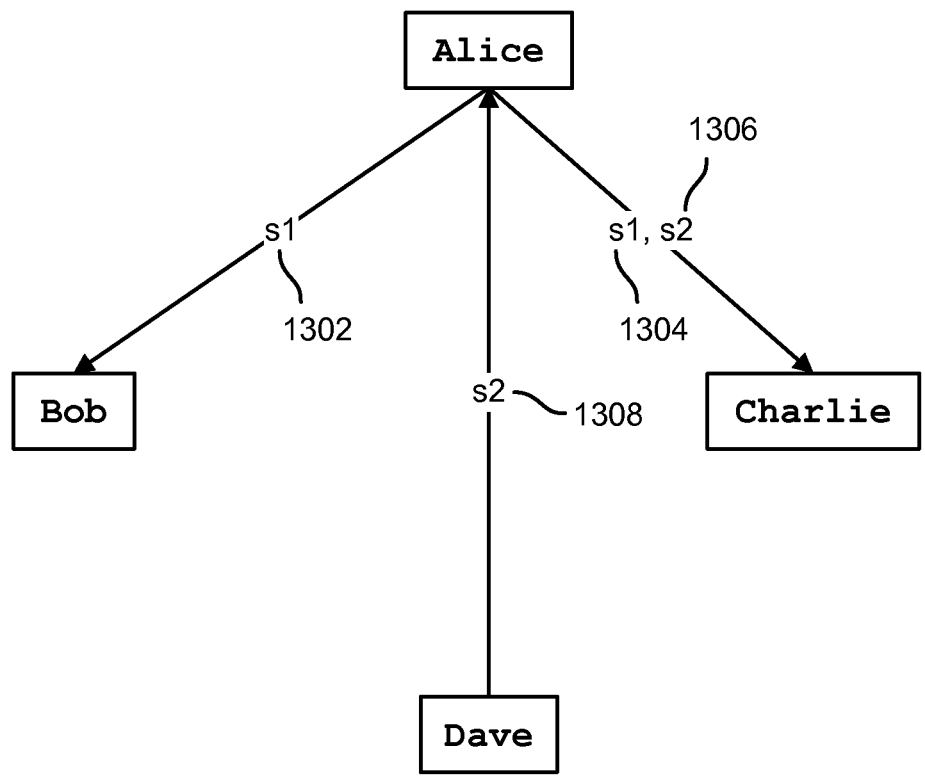
FIG. 13 illustrates an example of received preference information, depicted conceptually as a graph.

FIG. 13 illustrates an example of received preference information, depicted conceptually as a graph. Suppose user Alice has dugg two stories—s1 and s2. Alice dugg story s1 after users Bob (1302) and Charlie (1304). She dugg story s2 after Charlie (1306), but before a user Dave (1308). User Bob did not digg story s2.

Returning to the process of FIG. 12: In various embodiments, portion 1202 of the process occurs each time a preference event is received. The remaining portions of the process occur upon a request for a recommendation. Accordingly, portion 1202 may be repeated many times relative to each occurrence of portions 1204-1208. In some embodiments, all preference information is stored together in a single database 114. In other embodiments, multiple databases are employed (e.g., with each storing information pertaining to an item belonging to a specific category).

Suppose Alice diggs a popular story (e.g., with 1,000 diggs). In some embodiments, to prevent links between Alice and 1,000 pre-diggers from being inserted into database 114, a limit is applied such that the set of pre-diggers is truncated to be the first 20 diggers of the story.

When a user, such as Alice, diggs an item, two assumptions can be made: (1) that Alice recommends the story to other users; and (2) that other users who dugg the story prior to Alice are trustworthy at finding good content. At 1204 of the process shown in FIG. 12, user correlations are determined based on the preference information received at 1202. As will be described in more detail below, the preferences of those users most correlated with Alice can be used to recommend items to Alice.

One technique for determining user correlations at 1204 is to compute a Jaccard coefficient for a user and his/her associated pre-diggers. The higher the coefficient, the more similar the digging behavior of the given users. Recommendation engine 110 is configured to compute the correlation coefficient as follows. The coefficient "C" between a user A (e.g., Alice) and a pre-digger B (e.g., Bob) is the size of the intersection of the set of stories that Alice dugg ($S_A$) and the set of stories that Bob dugg ($S_B$) divided by the size of the union of the same two sets. Thus, $$C_{AB} = \frac{|S_A \cap S_B|}{|S_A \cup S_B|}.$$

In some embodiments, recommendation engine 110 evaluates all past digging activities between two users and in other embodiments, a limited amount of information is considered, such as by being limited to the last four weeks of activity. The value of C is between 0 and 1 (inclusive) and accounts for the fact that some users may digg more items than others. If user B diggs many stories, then the number of stories A must have dugg in common with user B will need to be higher than if user B diggs fewer stories in order for the coefficient to be the same. It also obeys a triangle inequality $C_{AC} \leq C_{AB} + C_{BC}$, where A, B, and C are any three users.

Other techniques for correlating user preferences can also be used. For example, in an embodiment in which preferences both for and against content are considered (instead of the example above which considers only diggs), a coefficient "C" between a user A and a predigger B can be computed as follows:

$$C_{AB} = \frac{|S_A^+ \cap S_B^+| + |S_A^- \cap S_B^-| - |S_A^+ \cap S_B^-| - |S_A^- \cap S_B^+|}{|S_A^+ \cup S_A^- \cup S_B^+ \cup S_B^-|}$$

where $S_A^+$ and $S_A^-$ are the set of items for which Alice has preferences for and against, respectively, and $S_B^+$ and $S_B^-$ are the set of items for which Bob has preferences for and against, respectively. In an embodiment in which preferences are indicated using values, the following is an example of how a correlation coefficient can be computed:

$$C_{AB} = \sqrt[i\in]{\frac{\sum_{S_A \cap S_A} |r_A^i - r_B^i|^2}{|S_A \cap S_B|}}$$

where $r_A^i$ and $r_B^i$ are the ratings (by users A and B, respectively) of an item i, and where $S_A$ and $S_B$ are the respective sets of items rated by A and B.

At 1206 in the process shown in FIG. 12, a set of users most correlated with a given user is determined. As one example, at 1206, the correlation coefficients between Alice and each of the pre-diggers to which she is linked by her digging activity are examined. A threshold is applied. For example, the thirty users having the highest correlation coefficients can be selected as a set at 1206. As another example, all users having a correlation coefficient of at least 0.5 can be selected as a set 1206. As yet another example, a function can be used to select as a set the "most correlated" users that takes into account both a threshold number of users and a minimum required score.

At 1208, one or more items are returned based at least in part on the preferences of the set of users determined at 1206. In some embodiments, all items preferred by the users in the set (but not yet rated by Alice) are returned. Other rules can also be employed at 1208 to refine or otherwise limit the items returned. One example rule is that only those items that have not yet been dugg by Alice and have not yet been promoted out of the upcoming queue be returned. Another example rule is that only those items that have not yet been read by Alice be returned. Yet another example rule is that a maximum of five items be returned at 1208 per user included in the set selected at 1206 (or a maximum number of items per user per category). Another example rule is that only ten items belonging to a given category (e.g., Sports vs. Politics) be returned.

If an insufficient number of items will be selected at 1208 as a result of the processing performed at 1206, portions 1206 and 1208 of the process can be repeated as needed, with relaxed thresholds, until an acceptable number of items can be returned. In various embodiments, minimum standards are specified to prevent the thresholds from being relaxed beyond a certain point.

In various embodiments, the process of FIG. 12 is performed in parallel across multiple recommendation engines, with each recommendation engine being responsible for items belonging to a particular category (e.g., sports vs. entertainment). The results are aggregated by system 102 prior to presentation to the user. Suppose Alice is most interested in Astronomy news and in Country music. She does not like Sports. Bob is most interested in Astronomy news and Sports. By independently computing correlation coefficients across different categories, Alice's compatibility with Bob will be high with respect to Astronomy, but low with respect to Sports. Accordingly, when items are selected for Alice, only Astronomy articles from Bob will be considered and not Sports articles.

Figure 14:
FIG. 14 illustrates an embodiment of an interface to a preference system.

FIG. 14 illustrates an embodiment of an interface to a preference system. The example shown is presented to Alice after she selects "Upcoming" tab 226 (shown in FIG. 2). In the example shown, 24 stories in have been recommended by recommendation engine 110 for Alice from the 11,877 stories presently available in the upcoming queue (1406).

As explained above, portion 1202 of the process shown in FIG. 12 is performed each time Alice (or another user) diggs an item or otherwise provides preference information to system 102. When Alice clicked on tab 226, portions 1204-1208 of the process were performed. The items selected as a result of the process are shown in region and are sorted in accordance with how long ago they were submitted to preference system 102.

In addition to the summary information included about each of the content items, an additional line (1408) appears above each item, alerting Alice as to why the particular item was recommended to her. The first item was recommended because a user, JoeJoe, whose correlation coefficient with Alice is 0.1, dugg the item. The second item was recommended because three different users (each of whose correlation coefficients with Alice exceeds an appropriate threshold) dugg the item. If Alice would like to see which three users were responsible for the recommendation, she can click on region 1410 and be presented with a list. Alice can also sort the 24 recommendations in order of the most matches (1412), which shows stories recommended through the biggest number of users like Alice and as a descending list based on digg count (1414) by selecting the appropriate option.

In region 1416, Alice is presented with a list of the diggers most like her. The list represents those users having the highest correlation coefficients with Alice (e.g., as determined at 1206 of the process shown in FIG. 12).

FIG. 15 illustrates an embodiment of an interface to a preference system. The example shown is presented to Alice after she selects region 1418 of the interface shown in FIG. 14. In region 1502, Alice is presented with the number of stories the user "Zippy" has dugg in the last 30 days. In region 1504, Alice is presented with the number of stories that she has dugg in the last 30 days. In region 1506, Alice is presented with the number of stories that she and Zippy commonly dugg. Alice can instruct recommendation engine 110 to exclude Zippy from the set determined at 1206 in the process shown in FIG. 12 by selecting region 1508. She can also add Zippy as a friend by selecting region 1510.

In region 1512, Alice is presented with one recommendation made by recommendation engine 110. The item was dugg by three people included in Alice's "Diggers Like You Set," one of which was Zippy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of recommending content for a user of a preference system comprising one or more processors, the method comprising:
    operating the one or more processors to determine a correlation between a first user and a second user of the preference system by:
        for at least two different types of preference events:
            identifying a total number of content items for which both the first user and the second user initiated preference events of the same type; and
            identifying an exclusion number of content items for which the first user and the second user initiated preference events of different types;
        subtracting the exclusion number from the total number to yield a numerator; and
        dividing the numerator by a total number of preference events initiated by the first user and the second user to yield a correlation value; and
    at the preference system, when the correlation between the first user and the second user is greater than a threshold, identifying content items for which positive preference events were received from the second user.

2. The method of claim 1, further comprising:
    repeating said determining a correlation for multiple users other than the second user.

3. The method of claim 2, further comprising:
    repeating said identifying content items for each of the multiple users.

4. The method of claim 1, further comprising:
    among the identified content items, filtering out content items previously presented to the first user.

5. The method of claim 1, further comprising, prior to operating the one or more processors:

receiving, from users of the preference system, preference events for a plurality of content items presented to the users; and for each content item in the plurality of content items, tracking a number of positive preference events received for the content item.

6. The method of claim 5, wherein tracking the number of positive preference events received for a given content item comprises:

recording in one or more databases each positive preference event received for the given content item; and for each positive preference event received for the given content item from a given user after an initial positive preference event is received for the given content item:
storing a directed link connecting the given user to at least one other user who earlier in time submitted a positive preference event for the given content item.

7. The method of claim 6, wherein determining the correlation between the first user and the second user further comprises:

for preference events submitted by the first user for multiple content items, traversing the stored links from the first user to identify at least one other user who submitted a preference event for at least one of the multiple content items.

8. The method of claim 1, further comprising:

selecting one or more of the identified content items as recommended content items for the first user;

displaying for the first user an interface for presenting the recommended content items; and for each recommended content item presented in the interface, offering the first user identities of a set of users from whom positive preference events were received for the content item.

9. The method of claim 8, further comprising:

identifying in the interface at least one user in the set of users; and indicating correlations between the first user and the at least one user.

10. The method of claim 8, further comprising:

receiving from the first user, via the interface, selection of a control associated with another user in the set of users; and displaying a second interface configured to display details of the correlation between the first user and the other user.

11. The method of claim 10, wherein said details of the correlation between the first user and the other user include a number of positive preference events received from the first user and the other user.

12. A computer program product for recommending content for a user of a preference system, the computer program product being embodied in a non-transitory computer readable storage medium and comprising instructions for:

determining a correlation between a first user and a second user of the preference system by:
for at least two different types of preference events:
identifying a total number of content items for which both the first user and the second user initiated preference events of the same type; and
identifying an exclusion number of content items for which the first user and the second user initiated preference events of different types;
subtracting the exclusion number from the total number to yield a numerator; and
dividing the numerator by a total number of preference events initiated by the first user and the second user to yield a correlation value; and
when the correlation between the first user and the second user is greater than a threshold, identifying content items for which positive preference events were received from the second user.

13. A preference system, comprising:

one or more processors; and a memory coupled with the one or more processors, wherein the memory is configured to provide the one or more processors with instructions that, when executed, cause the preference system to:

determine a correlation between a first user and a second user of the preference system by:
for at least two different types of preference events:
identifying a total number of content items for which both the first user and the second user initiated preference events of the same type; and
identifying an exclusion number of content items for which the first user and the second user initiated preference events of different types;
subtracting the exclusion number from the total number to yield a numerator; and
dividing the numerator by a total number of preference events initiated by the first user and the second user to yield a correlation value; and
when the correlation between the first user and the second user is greater than a threshold, identify content items for which positive preference events were received from the second user.

14. The preference system of claim 13, wherein the memory is further configured to provide the one or more processors with instructions that, when executed, cause the preference system to:

repeat said determining a correlation for multiple users other than the second user.

15. The preference system of claim 14, wherein the memory is further configured to provide the one or more processors with instructions that, when executed, cause the preference system to:

repeat said identifying content items for each of the multiple users.

16. The preference system of claim 13, wherein the memory is further configured to provide the one or more processors with instructions that, when executed, cause the preference system to:

among the identified content items, filter out content items previously presented to the first user.

17. The preference system of claim 13, wherein the memory is further configured to provide the one or more processors with instructions that, when executed, cause the preference system to, prior to determining the correlation between the first user and the second user:

receive, from users of the preference system, preference events for a plurality of content items presented to the users; and for each content item in the plurality of content items, track a number of positive preference events received for the content item.

18. The preference system of claim 17, wherein tracking the number of positive preference events received for a given content item comprises:

recording in one or more databases each positive preference event received for the given content item; and for each positive preference event received for the given content item from a given user after an initial positive preference event is received for the given content item: storing a directed link connecting the given user to at least one other user who earlier in time submitted a positive preference event for the given content item.

19. The preference system of claim 18, wherein determining the correlation between the first user and the second user further comprises:
for preference events submitted by the first user for multiple content items, traversing the stored links from the first user to identify at least one other user who submitted a preference event for at least one of the multiple content items.

20. The preference system of claim 13, wherein the memory is further configured to provide the one or more processors with instructions that, when executed, cause the preference system to:
select one or more of the identified content items as recommended content items for the first user;
display for the first user an interface for presenting the recommended content items; and
for each recommended content item presented in the interface, offer the first user identities of users from whom positive preference events were received for the content item.

21. The preference system of claim 20, wherein the memory is further configured to provide the one or more processors with instructions that, when executed, cause the preference system to:
identify in the interface at least one user in the set of users; and
indicate correlations between the first user and the at least one user.

22. The preference system of claim 20, wherein the memory is further configured to provide the one or more processors with instructions that, when executed, cause the preference system to:
receive from the first user, via the interface, selection of a control associated with another user in the set of users; and
display a second interface configured to display details of the correlation between the first user and the other user.

23. The preference system of claim 22, wherein said details of the correlation between the first user and the other user include a number of positive preference events received from the first user and the other user.

* * * * *